United States Patent
Lafon et al.

(10) Patent No.: US 8,840,246 B2
(45) Date of Patent: Sep. 23, 2014

(54) METHOD FOR DETERMINING AN EDGE OF AN UNCUT SPECTACLE LENS

(75) Inventors: Fabien Lafon, Charenton Le Pont (FR); Thierry Baudart, Charenton Le Pont (FR); Guillaume Martin, Charenton Le Pont (FR)

(73) Assignee: Essilor International (Compagnie Generale d'Optique), Charenton le Pont Cedex (FR)

( * ) Notice: Subject to any disclaimer, the term of this patent is extended or adjusted under 35 U.S.C. 154(b) by 157 days.

(21) Appl. No.: 13/519,118

(22) PCT Filed: Dec. 23, 2010

(86) PCT No.: PCT/EP2010/070670
§ 371 (c)(1),
(2), (4) Date: Oct. 2, 2012

(87) PCT Pub. No.: WO2011/076928
PCT Pub. Date: Jun. 30, 2011

(65) Prior Publication Data
US 2013/0063697 A1    Mar. 14, 2013

(30) Foreign Application Priority Data
Dec. 24, 2009   (EP) .................................. 09306329

(51) Int. Cl.
G02C 7/02        (2006.01)
B24B 9/14        (2006.01)

(52) U.S. Cl.
CPC .................................... B24B 9/148 (2013.01)
USPC ............ 351/159.76; 351/159.73; 351/159.74; 351/159.75; 351/159.77

(58) Field of Classification Search
CPC .... G02C 13/00; G02C 13/003; G02C 13/005; B24B 9/02; B24B 9/144; B24B 9/146; B24B 9/148
USPC ......................................... 351/159.73–159.77
See application file for complete search history.

(56) References Cited

U.S. PATENT DOCUMENTS

| | | | |
|---|---|---|---|
| 4,630,906 A | | 12/1986 | Bammert et al. |
| 4,991,305 A | * | 2/1991 | Saigo et al. ...................... 33/507 |
| 5,450,335 A | * | 9/1995 | Kikuchi ......................... 702/168 |
| 5,926,247 A | * | 7/1999 | Kimura ............................ 351/41 |
| 8,388,133 B2 | * | 3/2013 | Freson et al. ................. 351/178 |
| 2005/0251280 A1 | * | 11/2005 | Shibata .......................... 700/117 |
| 2009/0135371 A1 | * | 5/2009 | Joseph et al. .................. 351/177 |
| 2010/0293069 A1 | * | 11/2010 | Freson et al. ................... 705/26 |

FOREIGN PATENT DOCUMENTS

| | | |
|---|---|---|
| EP | 0 094 629 | 11/1983 |
| EP | 1 728 590 | 12/2006 |
| WO | WO 2006/084771 | 8/2006 |

* cited by examiner

*Primary Examiner* — Ricky Mack
*Assistant Examiner* — William Alexander
(74) *Attorney, Agent, or Firm* — Cozen O'Connor

(57) ABSTRACT

Method for determining the edge contour of an uncut spectacle lens comprises: a spectacle frame data providing step, a minimum edge thickness providing step, an initial contour providing step, a thickness determining step, an optimized point selecting step, a repeating step, and a edge contour determining step.

10 Claims, 2 Drawing Sheets

US 8,840,246 B2

METHOD FOR DETERMINING AN EDGE OF AN UNCUT SPECTACLE LENS

This is a U.S. National Phase Application under 35 USC 371 of International Application PCT/EP2010/070670 filed on Dec. 23, 2010.

This application claims the priority of European application no. 09306329.5 filed Dec. 24, 2009, the entire content of which is hereby incorporated by reference.

BACKGROUND OF THE INVENTION

The present invention relates to a method implemented by computer means for determining an edge contour of an uncut spectacle lens, a method for optimizing the selection of a holding unit for holding an uncut spectacle lens and a method for edging an uncut spectacle lens.

In particular, the invention provides a process for the elimination of sharp lens edges in the manufacturing of spectacle lenses.

The use of spectacle lenses for the correction of ametropia is well known. Typically, a polymeric article, conventionally known as a lens blank, is manufactured by casting or machining, which blank has a first surface having at least one refractive power. The second surface of the blank is then machined to provide what is known as an "uncut lens", the second surface of which has at least one additional refractive power.

The machining of the second surface can result in formation of a sharp edge at the periphery of the uncut lens. The sharp edge is disadvantageous in that it is prone to cracking or chipping resulting in one or both of contamination of subsequent cleaning or coating steps of the manufacturing process and an unusable uncut lens. Additionally, the sharp edge may prematurely damage the polishing tools, for example the polishing tools may be worn or torn off by cutting. Finally, uncut lenses with sharp edges are more likely to exhibit coating defects and be rejected as unacceptable from a cosmetic basis.

In conventional lens manufacturing processes, sharp edge that remains after machining may be eliminated by hand-filing or grinding of the edge. Alternatively, the periphery of the blank or uncut lens may be cut, or cribbed, to an elliptical shape to eliminate the sharp edge. These methods are disadvantageous in that they either add labor and, thus, cost to lens production or the sharp edges are not eliminated in all cases.

SUMMARY OF THE INVENTION

One object of the present invention is to provide a method for determining an edge contour of an uncut spectacle lens that does not comprise a sharp edge.

For this purpose, one aspect of the invention is a method implemented by computer means for determining an edge contour of an uncut spectacle lens, the method comprises:
- a spectacle frame data providing step, in which data defining the contour of the spectacle frame comprising the coordinates of n points $P_1, P_2, \ldots P_n$ of the contour of the spectacle frame are provided,
- a minimum edge thickness providing step in which the minimum edge thickness Epmin of the uncut spectacle lens is provided,
- an initial contour providing step in which is provided an initial contour Ci of the uncut spectacle lens comprising n points $A_{i,1}, A_{i,2}, \ldots A_{i,n}$, with for j comprised between 1 and n points $A_{i,j}$, $P_j$ and the prism reference point O of the spectacle lens are aligned and $OA_{i,j} > OP_j$,
- a thickness determining step in which the thickness $Ep(A_{i,j})$ of the uncut spectacle lens at point is determined,
- an optimized point selecting step, in which an optimized point $A_{o,j}$ is selected and wherein
  if the thickness $Ep(A_{i,j})$ of the uncut spectacle lens at point $A_{i,j}$ is greater or equal to the minimum edge thickness Epmin, $A_{o,j} = A_{i,j}$,
  if the thickness $Ep(A_{i,j})$ at point $A_{i,j}$ is smaller than the minimum edge thickness Epmin, the position of the optimized point along the radial direction between point $A_{i,j}$ of the initial contour Ci and point $P_j$ of the contour of the spectacle frame is determined by an iterative process comprising I iterations so as to have $|Ep(A_{o,j}) - Epmin| \leq \Theta$, with $Ep(A_{o,j})$ the thickness of the uncut spectacle lens at point $A_{o,j}$, and 0.001 mm$\leq \epsilon \leq$Epmin, and
  if after I iterations no point $A_{o,j}$ so as to have $|Ep(A_{o,j}) - Epmin| \leq 0.01$ mm is determined, optimized point $A_{o,j}$ is selected between point $A_{i,j}$ and point $P_j$,
- a repeating step in which the thickness determining step and the optimized point $A_{o,j}$ selecting step are repeated for j comprised between 1 and n,
- a edge contour determining step in which the edge contour of the uncut spectacle lens delimited by the n optimized points is determined.

Advantageously, by adjusting the value of the minimum edge thickness in the method according to the invention, the skilled person may determine an edge contour of an uncut spectacle lens free of sharp edge.

According to further embodiments of the present invention, which can be considered alone or in combination:
- the method further comprises the step of adding a safety margin SM to each point $P_1, P_2, \ldots P_n$ of the contour of the spectacle frame;
- the method further comprises prior to the thickness determining step a holding unit selecting step in which a holding unit $H_p$ having a center $C_p$ and a diameter $D_p$ is selected among a list of holding units $H_1, H_2, \ldots H_k$, respectively having a centers $C_1, C_2, \ldots C_k$, and diameters $D_1 < D_2 < \ldots < D_k$, wherein $D_{p+2}d < D_i \leq D_{p+1} + 2d$, with Di the diameter of the initial contour and d the distance between the prism reference point O of the spectacle lens and the center of the holding unit Hp when the spectacle lens is mounted on the holding unit Hp with $0 \leq d \leq D_i/2$, and during the optimized point selecting step:
if the thickness $Ep(A_{i,j})$ at point $A_{i,j}$ is smaller than the minimum edge thickness Epmin, the position of the optimized point $A_{o,j}$ along the radial direction is determined by the iterative process between point $A_{i,j}$ of the initial contour Ci and a point $Q_j$ such that $C_pQ_j = \text{Max}[C_pP_j; D_p/2]$, with $C_p$ and $D_p$ the center and the diameter of the holding unit $H_p$ and if after I iterations no optimized point $A_{o,j}$ is determined, a point $A_{o,j}$ between point $A_{i,j}$ and point $Q_j$ is selected;

the method further comprises after the optimized point selecting step and prior to the edge contour determining step a holding unit optimization step in which if Min(Ep $(A_{o,j})) <$ Epmin for j comprised between 1 and n, with $Ep(A_{o,j})$ the thickness of the uncut spectacle lens at point $A_{o,j}$ and Epmin the minimum edge thickness for the uncut spectacle lens and if $D_p > D_1$, the holding unit $H_{p-1}$ is selected and the optimized point $A_{o,j}$ selecting step and the following steps are repeated for j comprised between 1 and n with the holding unit $H_{p-1}$;

the method further comprises:

a maximum thickness providing step in which a maximum thickness Epmax of the spectacle lens is provided, after the optimized point selecting step and prior to the edge contour determining step, a thickening step in which if for j comprised between 1 and n:

Min(EP($A_{o,j}$))<Epmin, and
Epmin−Min(EP($A_{o,j}$))≤Epmax, each point of the spectacle lens is thickened of Epmin−Min(EP($A_{o,j}$)); and the iterative process is a dichotomy process.

The invention also relates to a method for optimizing the selection of a holding unit H for holding an uncut spectacle lens comprising:

an initial holding unit providing step in which a initial holding unit $H_{ini}$ is provided, a maximum difference providing step in which the maximum difference EcaMax between the edge of the spectacle lens to be hold by the holding unit and the edge of the selected holding unit H is provided, an edge contour determining step in which the edge contour of the uncut spectacle lens is determined according to the method of the invention, a holding unit optimization step in which the last selected holding unit $H_f$ of center $C_f$ and diameter $D_f$ during the edge contour determining step is selected if for j comprised between 1 and n: Max(CfAo,j)−$D_f$/2≤EcaMax.

Another aspect of the invention relates to a method of edging an uncut spectacle lens comprising:

an edge contour determining step in which the optimized edge contour of the uncut spectacle lens is determined according to the invention, an edging step in which the uncut spectacle lens is edged according to the optimized edged contour.

Another aspect of the invention relates to a computer program product comprising one or more stored sequence of instruction that is accessible to a processor and which, when executed by the processor, causes the processor to carry out the steps of a method according to the invention.

Another aspect of the invention relates to a computer readable medium carrying one or more sequences of instructions of the computer program product of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other features and advantages of the present invention will become apparent in the description herein below of non-limiting exemplary embodiments, making reference to the appended drawings, in which.

Figure 1:
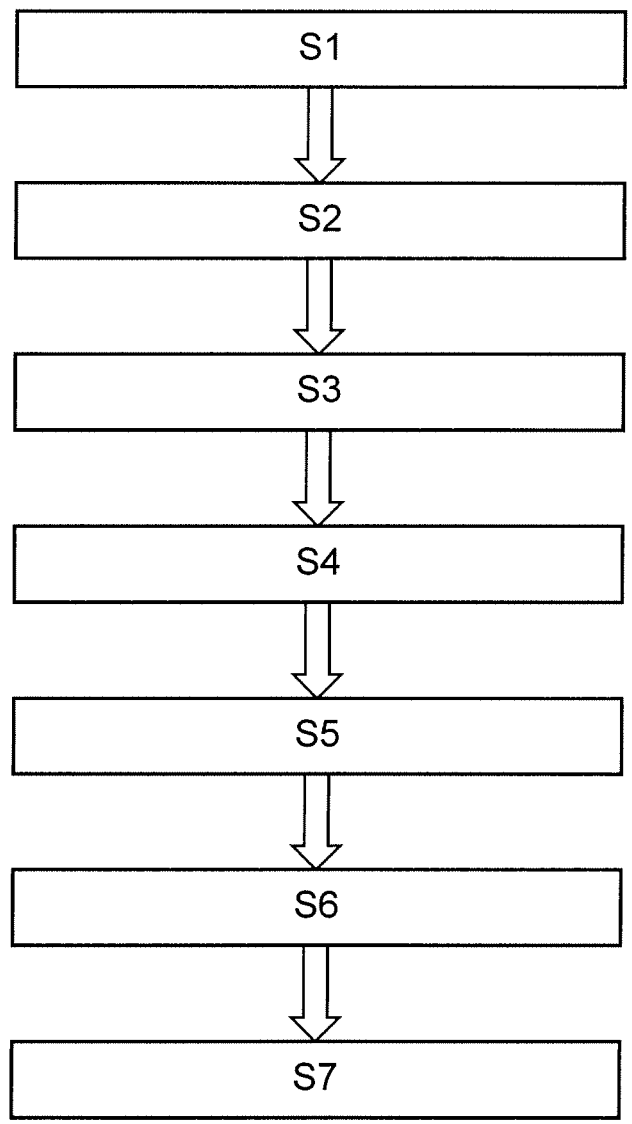
FIG. 1 is a flowchart of the different steps of a method according to an embodiment of the invention.
Figure 2:
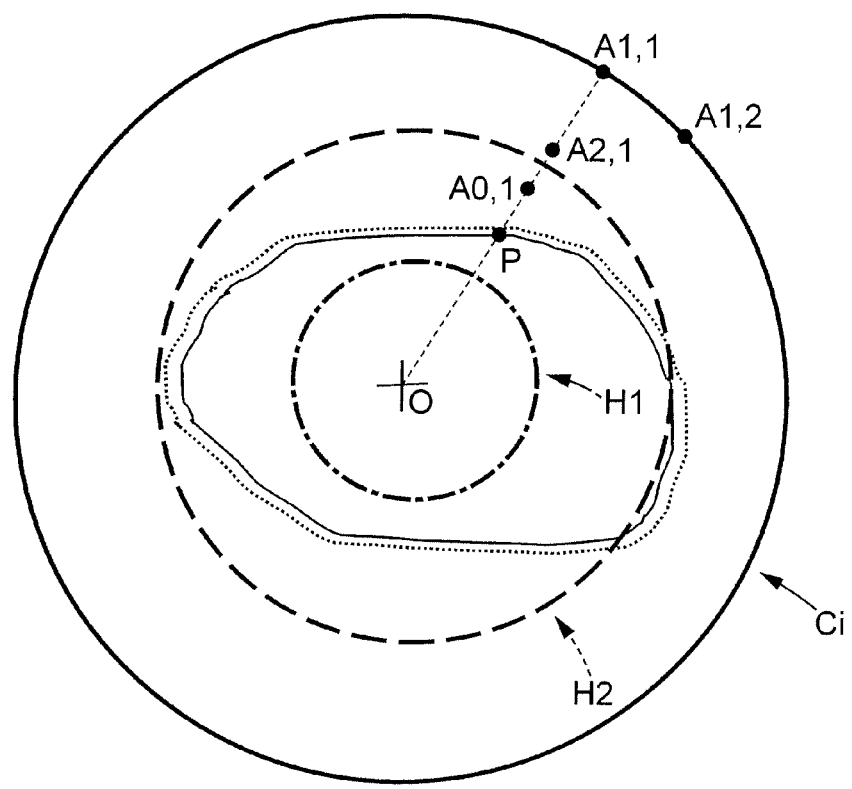
FIG. 2 is a schematic representation of the different contours used when implementing the method according to the invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

According to an embodiment of the invention, the method for determining the edge contour of an uncut spectacle lens comprises:

a spectacle frame data providing step S1,
a minimum edge thickness providing step S2,
an initial contour providing step S3,
a thickness determining step S4,
an optimized point selecting step S5,
a repeating step S6, and
a edge contour determining step S7.

Uncut spectacle lens data defining the uncut spectacle lens are provided, for example the equations of the front and rear face of the uncut spectacle frame and the distance between the front and rear face at a given point of these surfaces.

The spectacle frame data providing step S1 comprises providing data defining the contour of the spectacle frame. The data may comprise the coordinates of n points $P_1, P_2, \ldots P_n$ of the contour 10 of the spectacle frame. According to an embodiment of the invention, the data may comprise 36 points.

The method according to the invention may further comprise the step of providing or adding a safety margin 12 to each point $P_1, P_2, \ldots P_n$ of the contour of the spectacle frame. Advantageously, the safety margin replaces the contour 10 of the spectacle frame during the method according to the invention. According to an embodiment of the invention, the safety margin 12 may add from 0.5 mm to 1 cm for example 1.5 mm, to each distances $OP_j$ with 0 the prism reference point and j comprised between 1 and n.

During the minimum edge thickness providing step S2, the desired minimum edge thickness Epmin of the uncut spectacle lens is provided. The minimum edge thickness may be determined so as to provide an uncut spectacle lens free of sharp edge. For example the minimum edge thickness Epmin is greater or equal to 0.1 mm, for example equal to 0.4 mm.

During the initial contour providing step S3, an initial contour Ci of the uncut spectacle lens comprising n points $A_{i,1}, A_{i,2}, \ldots A_{i,n}$, is provided. For j comprised between 1 and n, points $A_{i,j}$, $P_i$ and the prism reference point O of the spectacle lens are aligned and $OA_{i,j} > OP_j$.

During the thickness determining step S4 the thickness $Ep(A_{i,j})$ of the uncut spectacle lens at point $A_{i,j}$ is determined. Such determination may be obtained using the uncut spectacle lens data.

During the optimized point selecting step S5, an optimized point $A_{o,j}$ is selected according to the following conditions.

If the thickness $Ep(A_{i,j})$ of the uncut spectacle lens at point $A_{i,j}$ is greater or equal to the minimum edge thickness Epmin, the point $A_{i,j}$ is selected as optimized point $A_{o,j} = A_{i,j}$.

If the thickness $Ep(A_{i,j})$ at point $A_{i,j}$ is smaller than the minimum edge thickness Epmin, the position of the optimized point $A_{o,j}$ is determined along the radial direction between point $A_{i,j}$ of the initial contour Ci and point $P_j$ of the contour of the spectacle frame. The optimized point may be determined by an iterative process comprising I iterations, for example a dichotomy process form example limited to 1000 iterations.

The first point $A_{k,j}$ between point $A_{i,j}$ of the initial contour Ci and point $P_j$ of the contour of the spectacle frame for which the condition $|Ep(A_{k,j}) - \text{Epmin}| \leq \epsilon$, with $Ep(A_{k,j})$ the thickness of the uncut spectacle lens at point $A_{k,j}$, and $0.001 \text{ mm} \leq \epsilon \leq \text{Epmin}/5$ is fulfilled is selected as the optimized point, $A_{o,j} = A_{k,j}$.

If after I iterations, for example 1000 iterations, no optimized point has been determined, the optimized point $A_{o,j}$ is selected between point $A_i$, and point $P_j$. For example, point $P_j$ is selected as optimized point.

According to an embodiment of the invention, the thickness determining step S4 and the optimized point $A_{o,j}$ selecting step S5 are repeated for j comprised between 1 and n during the repeating step S6.

During the edge contour determining step S7, the edge contour of the uncut spectacle lens delimited by the n optimized points is determined.

According to an embodiment of the invention, the method may further comprises prior to the thickness determining step S4 a holding unit selecting step in which a holding unit $H_p$ having a center $C_p$ and a diameter $D_p$ is selected. The holding unit Hp is selected among a list of holding units $H_1, H_2, \ldots H_k$, respectively having a diameter $D_1 < D_2 < \ldots < D_k$.

According to an embodiment of the invention, the holding unit Hp is selected so as to satisfy the condition that $D_{p+2}d < D_i \leq D_{p+1} + 2d$, with Di the diameter of the initial contour Ci when centered on the prism reference point of the uncut spectacle lens and d the distance between the center of the holding unit Hp and the prism reference point when the spectacle lens is mounted on the holding unit Hp.

The distance d is greater or equal to 0 and smaller or equal to Di/2, for example smaller or equal to Di/4.

According to such embodiment of the invention the optimized point selecting step further comprises the following conditions.

If the thickness $Ep(A_{i,j})$ at point $A_{i,j}$ is smaller than the minimum edge thickness Epmin, the position of the optimized point $A_{o,j}$ along the radial direction is determined by an iterative process between point $A_{i,j}$ of the initial contour Ci and a point $Q_j$ such that $C_p Q_j = \text{Max}[C_p P_j; D_p/2]$.

If after I iterations, for example 1000, no optimized point $A_{o,j}$ is determined, a point $A_{o,j}$ between point $A_{i,j}$ and point $Q_j$ is selected, for example $A_{o,j} = Q_j$.

When no optimized point having a thickness greater or equal to the minimum thickness providing step is determined, the method according to the invention proposes adding a thickening quantity to the spectacle lens. According to an embodiment of the invention, a thickening quantity is added to all the points of the spectacle lens.

Advantageously, determining the optimized points between points $Q_j$ and $A_{i,j}$ allows reducing the risk that the holding unit be machined during the machining process.

According to such embodiment of the invention, the method further comprise a maximum thickness providing step in which a maximum thickness Epmax of the spectacle lens is provided. Advantageously, the thickness quantity is limited so as to limit the weight and/or the price of the spectacle lens and/or to fulfill esthetic criteria.

The method may comprise after the optimized point selecting step and prior to the edge contour determining step, a thickening step.

During the thickening step if for j comprised between 1 and n, $\text{Min}(EP(A_{o,j})) \geq \text{Epmin}$, the n optimized points are selected.

If for j comprised between 1 and n $\text{Min}(EP(A_{o,j})) < \text{Epmin}$, the thickness Epadd to be added to each of the n optimized points of the spectacle lens so as to have for j comprised between 1 and n $\text{Min}(EP(A_{o,j})) = \text{Epmin}$ is determined.

If the thickness Epadd is smaller or equal to the maximum thickness Epmax, a new thickness for each of the points of the spectacle lens is calculated by adding the thickness Epadd and the n optimized points with there new thicknesses are selected.

If the thickness Epadd is greater to the maximum thickness Epmax, the n optimized points with their initial thicknesses are selected.

The invention also relates to a method for optimizing the selection of a holding unit H for holding an uncut spectacle lens.

Such method comprises an initial holding unit providing step in which an initial holding unit $H_{ini}$ is provided.

The method further comprises a maximum difference providing step in which the maximum difference EcaMax between the edge of the spectacle lens to be hold by the holding unit and the edge of the selected holding unit H is provided.

Advantageously, limiting the difference EcaMax between the edge of the spectacle lens to be hold by the holding unit and the edge of the selected holding unit H is provided helps reduce the risk that the spectacle lens tip over during the machining process and/or reduce the vibration of the spectacle lens during the machining process.

The method also comprises an edge contour determining step in which the edge contour of the uncut spectacle lens is determined according to a method of the invention described in detailed here above.

The method further comprises a holding unit optimization step in which the last selected holding unit $H_f$ of center $C_f$ and diameter $D_f$ during the edge contour determining step is selected if for j comprised between 1 and n: $\text{Max}(C_f A_{o,j}) - D_f/2 \leq \text{EcaMax}$.

The invention further relates to a method of edging an uncut spectacle lens according to an optimized edge contour determined according to a method of the invention.

The invention has been described above using embodiments without limitation of the general inventive concept.

The invention claimed is:

1. A method for determining an edge contour of an uncut spectacle lens and implemented by a computer programmed to perform the method, the method comprising:
    a spectacle frame data providing step, in which data defining the contour of the spectacle frame comprising the coordinates of n points $P_1, P_2, \ldots P_n$ of the contour of the spectacle frame are provided, where n is an integer,
    a minimum edge thickness providing step, in which the minimum edge thickness Epmin of the uncut spectacle lens is provided,
    an initial contour providing step, in which is provided an initial contour Ci of the uncut spectacle lens comprising n points $A_{i,1}, A_{i,2}, \ldots A_{i,n}$, with j between 1, and n points $A_{i,j}$, $P_j$ and the prism reference point O of the spectacle lens are aligned by the computer and $OA_{i,j} > OP_j$,
    a thickness determining step, in which the thickness $Ep(A_{i,j})$ of the uncut spectacle lens at point $A_{i,j}$ is determined by the computer,
    an optimized point selecting step, in which an optimized point $A_{o,j}$ is selected by the computer and wherein
        if the thickness $Ep(A_{i,j})$ of the uncut spectacle lens at point $A_{i,j}$ is greater or equal to the minimum edge thickness Epmin, $A_{o,j} = A_{i,j}$,
        if the thickness $Ep(A_{i,j})$ at point $A_{i,j}$ is smaller than the minimum edge thickness Epmin, the position of the optimized point $A_{o,j}$ along the radial direction between point Ai,j of the initial contour Ci and point $P_j$ of the contour of the spectacle frame is determined by the computer by an iterative process comprising I iterations so as to have $|Ep(A_{o,j}) - Epmin| \leq \epsilon$, with $Ep(A_{o,j})$ the thickness of the uncut spectacle lens at point $A_{o,j}$, and $0.001$ mm $\leq \epsilon \leq$ Epmin/5, and
        if after I iterations, where I is an integer, no point $A_{o,j}$ having $|Ep(A_{o,j}) - Epmin| \leq 0.01$ mm is determined, optimized point $A_{o,j}$ is selected by the computer between point $A_{i,j}$ and point $P_j$,
    a repeating step, in which the thickness determining step and the optimized point $A_{o,j}$ selecting step are repeated j times, where j is between 1 and n,
    an edge contour determining step, in which the edge contour of the uncut spectacle lens delimited by the n optimized points is determined by the computer.

2. The method according to claim 1, wherein the method further comprises the step of adding a safety margin SM to each point $P_1, P_2, \ldots P_n$ of the contour of the spectacle frame.

3. The method according to claim 1, wherein the method further comprises prior to the thickness determining step a holding unit selecting step in which a holding unit $H_p$ having a diameter $D_p$ is selected by the computer from among a list of holding units $H_1, H_2, \ldots H_k$, respectively having centers $C_1, C_2, \ldots C_k$, and diameters $D_1 < D_2 < \ldots < D_k$, wherein $D_p + 2d < D_i \leq D_{p+1} + 2d$, with $D_i$ the diameter of the initial contour and d the distance between the prism reference point O of the spectacle lens and the center of the holding unit $H_p$ when the spectacle lens is mounted on the holding unit $H_p$ with $0 \leq d \leq D_i/2$, where k is an integer,
    and during the optimized point selecting step:
        if the thickness $Ep(A_{i,j})$ at point $A_{i,j}$ is smaller than the minimum edge thickness Epmin, the position of the optimized point $A_{o,j}$ along the radial direction is determined by the computer by the iterative process between point $A_{i,j}$ of the initial contour Ci and a point $Q_j$ such that $C_p Q_j = \text{Max}[C_p P_j; D_p/2]$, and
        if after I iterations no optimized point $A_{o,j}$ is determined, a point $A_{o,j}$ between point $A_{i,j}$ and point $Q_j$ is selected by the computer.

4. The method according to claim 3, wherein the method further comprises after the optimized point selecting step and prior to the edge contour determining step a holding unit optimization step in which
    if $\text{Min}(Ep(A_{o,j})) < $ Epmin for j between 1 and n, with $Ep(A_{o,j})$ the thickness of the uncut spectacle lens at point $A_{o,j}$ and Epmin the minimum edge thickness for the uncut spectacle lens and if $D_p > D_1$, the holding unit $H_{p-1}$ is selected by the computer and the optimized point $A_{o,j}$ selecting step and the following steps are repeated j times, where j is between 1 and n with the holding unit $H_{p-1}$.

5. The method according to claim 1, wherein the method further comprises:
    a maximum thickness providing step in which a maximum thickness Epmax of the spectacle lens is provided,
    after the optimized point selecting step and prior to the edge contour determining step, a thickening step in which if for j between 1 and n:
    $\text{Min}(EP(A_{o,j})) < $ Epmin, and
    $\text{Epmin} - \text{Min}(EP(A_{o,j})) \leq $ Epmax,
    each point of the spectacle lens has a thickness of
    $\text{Epmin} - \text{Min}(EP(A_{o,j}))$.

6. The method according to claim 5, wherein the iterative process is a dichotomy process.

7. A method for optimizing the selection of a holding unit H for holding an uncut spectacle lens comprising:
    an initial holding unit providing step in which a initial holding unit $H_{ini}$ is provided, a maximum difference providing step in which the maximum difference EcaMax between the edge of the spectacle lens to be hold by the holding unit and the edge of the selected holding unit H is provided,
    an edge contour determining step in which the edge contour of the uncut spectacle lens is determined according to the method of claim 4,
    a holding unit optimization step in which the last selected holding unit $H_f$ of center $C_f$ and diameter $D_f$ during the edge contour determining step is selected if for j between 1 and n: $\text{Max}(C_f A_{o,j}) - D_f/2 \leq $ EcaMax.

8. A method of edging an uncut spectacle lens comprising:
    an edge contour determining step in which the optimized edge contour of the uncut spectacle lens is determined according to claim 1,
    an edging step in which the uncut spectacle lens is cut by edging thereof according to the optimized edged contour.

9. A computer program product comprising one or more stored sequence of instructions accessible to a processor and which, when executed by the processor, causes the processor to carry out the steps of claim 1.

10. A computer readable medium carrying one or more sequences of instructions of the computer program product of claim 9.

* * * * *